United States Patent [19]
Rajagopalan

[11] Patent Number: 5,919,862
[45] Date of Patent: Jul. 6, 1999

[54] GOLF BALL COMPOSITIONS CONTAINING POLYMERIC COMPATIBILIZERS FREE OF α,β-ETHYLENICALLY UNSATURATED CARBOXYLIC ACIDS

[75] Inventor: Murali Rajagopalan, South Dartmouth, Mass.

[73] Assignee: Acushnet Company, Fairhaven, Mass.

[21] Appl. No.: 08/786,618

[22] Filed: Jan. 21, 1997

[51] Int. Cl.⁶ .................................................. A63B 37/12
[52] U.S. Cl. ................. 525/63; 525/72; 525/74; 473/372; 473/373; 473/385
[58] Field of Search .................... 473/372, 373, 473/385; 525/63, 72, 74

[56] References Cited

U.S. PATENT DOCUMENTS

| | | | |
|---|---|---|---|
| 3,870,841 | 3/1975 | Makowski et al. | 260/23.7 R |
| 4,102,876 | 7/1978 | Brenner et al. | 526/19 |
| 4,255,540 | 3/1981 | Weiss | 525/332 |
| 4,840,982 | 6/1989 | Campbell et al. | 524/151 |
| 4,919,434 | 4/1990 | Saito | 473/373 |
| 4,956,438 | 9/1990 | Ruetman et al. | 528/60 |
| 4,986,545 | 1/1991 | Sullivan | 273/235 |
| 5,098,105 | 3/1992 | Sullivan | 273/235 |
| 5,155,157 | 10/1992 | Statz et al. | 524/423 |
| 5,218,057 | 6/1993 | Kurkov et al. | 525/369 |
| 5,314,187 | 5/1994 | Proudfit | 473/373 |
| 5,321,089 | 6/1994 | Cadorniga et al. | 525/196 |
| 5,359,000 | 10/1994 | Hamada et al. | 525/74 |
| 5,397,840 | 3/1995 | Sullivan et al. | 525/221 |
| 5,543,467 | 8/1996 | Hamada | 525/221 |
| 5,565,524 | 10/1996 | Hamada et al. | 525/208 |
| 5,631,324 | 5/1997 | Rajagopalan | 525/221 |
| 5,679,745 | 10/1997 | Hamada et al. | 525/195 |
| 5,692,974 | 12/1997 | Wu et al. | 473/377 |

FOREIGN PATENT DOCUMENTS 0 557 069  8/1993  European Pat. Off. ........ C08L 23/08

OTHER PUBLICATIONS

P. Rajagopalan et al. J. Polym. Sci. Pt. B, Polym. Physics, 33:495–503 (1995).
R.A. Weiss and X. Lu Polymer, 35(9):1963–1969 (1994).
X. Lu and R.A. Weiss Macromol., 25:6185–6189 (1992).
Z. Gao et al. Macromol., 25:6460–6465 (1992).
W.J. MacKnight and T.R. Earnest, Jr., Journal of Polymer Science Macromolecular Reviews, 16:99–101 (1981).
Advances in Urethane Ionomers, Technomic Publishing Co., Inc., H.X. Xiao and K.C. Frisch.
Gersappe et al., The Use of Graft Copolymers to Bind Immiscible Blends, Science, 265 1072–1074, Aug. 19, 1994.

*Primary Examiner*—David Buttner
*Attorney, Agent, or Firm*—Pennie & Edmonds LLP

[57] ABSTRACT

A golf ball and a method of making a golf ball, having a cover and a core, wherein the golf ball has at least one layer formed of a compatibilized blend of about 4 percent to 95 percent of at least one ionomer resin; about 95 percent to 4 percent of at least one non-ionic polymer; and about 1 to 15 phr, based on 100 parts ionomer resin and non-ionic polymer, of at least one compatibilizer of a functionalized block and graft polymers and oligomers, wherein the compatibilizer is free of any monomers containing an α,β-ethylenically unsaturated carboxylic acid, and wherein at least one portion of the non-carboxylic acid compatibilizer is miscible with the at least one ionomer and at least one portion of the non-carboxylic acid compatibilizer is miscible with the at least one non-ionic polymer.

28 Claims, No Drawings

GOLF BALL COMPOSITIONS CONTAINING POLYMERIC COMPATIBILIZERS FREE OF α,β-ETHYLENICALLY UNSATURATED CARBOXYLIC ACIDS

TECHNICAL FIELD

The present invention is directed to a method for producing an improved golf ball with improved materials properties by compatibilizing normally incompatible mixtures of polymeric materials used in forming, e.g., golf ball covers, cover layers, intermediate and mantle layers, and cores and core layers, and, more particularly, to a golf ball comprising compatibilized blends of otherwise incompatible ionomers and non-ionic thermoplastics. The incompatibility of the mixtures is overcome by the addition of at least one block, graft, or random polymer or oligomer that is substantially free of carboxylic acid groups as a compatibilizer to form a compatible blend.

BACKGROUND OF THE INVENTION

Three-piece, wound balls with balata (trans-polyisoprene) covers are typically preferred by professional and low handicap amateur golfers. These balls provide better golfers with a combination of distance, high spin rate, and control that is not available with an ionomer cover or in one-piece and two-piece balls. However, balata cuts easily, and lacks the durability required by the average golfer.

Two-piece golf balls, which are used by the average amateur golfer, provide a combination of durability and maximum distance that is not available with balata covered balls. These balls comprise a core formed of a single solid sphere, which typically comprises a polybutadiene based compound, encased in an ionomer cover, such as SURLYN®. These balls are extremely durable, and are almost impossible to cut. However, the durability results from the hardness of the ionomer, which gives such balls a very hard "feel" when struck with a golf club that many golfers find unacceptable.

Manufacturers have attempted to form blends of ionomers with other, softer polymers to soften the ball and improve the feel and the spin rate. Ionomers are ionic copolymers of an olefin and an unsaturated carboxylic acid in which at least a portion of the carboxylic acid groups have been neutralized with a metal ion. As a result, ionomers are immiscible with many other, softer polymers in the same manner as oil and water. A highly polar ionomer will not blend properly with either non-polar polymers or with polar, but non-ionic polymers that are sufficiently different chemically from ionomers that strong interactions between the polymers and the ionomers are not present in the mixture.

A mixture of polymer components is immiscible unless strong interactions are present between the polymer components in the mixture, such as those that exist between polymers with similar polarities. It is only when these strong interactions are present between the polymer components in the mixture that the polymers are miscible. As a result, mixtures of ionomers and non-polar polymers or of ionomers and polar polymers that cannot form strong interactions are immiscible.

A blend of miscible polymers is homogeneous on a microscopic scale, and consists of a single, continuous phase. In contrast, separate phases are formed in mixtures of immiscible polymers. Typically, the polymer that is present in the lower concentration forms a discontinuous or discrete phase, and the polymer that is present in the higher concentration forms a continuous phase. Mixtures of polymers that are highly immiscible are heterogeneous on a macroscopic scale, as well as on the microscopic scale. Golf balls formed with mixtures of polymers that are highly immiscible, such as prior art balls having a cover formed from a blend of an ionomer and a thermoplastic urethane, lack durability, and crack or split on impact.

Polymers are not always totally miscible or totally immiscible. Blends of such polymers are heterogeneous on a microscopic scale, but may be homogeneous on a macroscopic scale. Immiscible blends that are homogeneous on a macroscopic scale are referred to as being compatible, and often provide commercially attractive polymer blends that frequently possess enhanced physical properties when compared to the constituent polymers. Compatible blends form two phases that do not have well-defined boundaries, as each polymer can partially penetrate the phase of the other polymer. This interfacial interaction results in the improved properties of the compatible blend. Immiscible blends can also be compatibilized by the addition of a molecule that is at least partially miscible in each of the two phases, so that the interfacial interaction between the polymers in the two phases is improved.

Attempts have been made to overcome the deficiencies of blends of ionomers with other, softer polymers that would be expected to be immiscible or incompatible. For example, U.S. Pat. No. 5,397,840 to Sullivan et al. discloses blends of "ionic" and "non-ionic copolymers". Although it would be expected that blends of ionic and non-ionic polymers would be immiscible, both the "ionic copolymers" and "non-ionic copolymers" disclosed by Sullivan are highly polar, and, thus, strong interactions are present between the polymer components in the blend, which presumably result from "ion-hopping" during the blending stage. Therefore, the polymers in these blends are miscible, or at least compatible. The "ionic copolymers" are ionomers, consisting of a copolymer of an α-olefin and an α,β-ethylenically unsaturated carboxylic acid, where at least part of the acid groups are neutralized by a metal derivative. The "non-ionic" copolymers are simply copolymers or terpolymers of ethylene and acrylic or methacrylic acid or propylene and acrylic acid, i.e., an α-olefin and an α,β-ethylenically unsaturated carboxylic acid, in which the carboxylic acid groups are not neutralized. Blending such a "non-ionic" polymer with one or more ionomers would likely result in an exchange of acidic protons from the carboxylic acid groups of the "non-ionic" polymers and metal ions from the neutralized carboxylic acid groups in the ionomers, resulting in a blend of ionomers, which would be expected to be miscible.

U.S. Pat. No. 5,359,000 to Hamada et al. describes a golf ball cover material formed from a heated mixture of an ionomer resin, a copolymer of maleic anhydride or a polymer modified with maleic anhydride, and a metal hydroxide, metal carbonate, or metal acetate. As with U.S. Pat. No. 5,397,840, there are strong interactions between the components in the blend, so that the mixture of polymers appear to be miscible.

U.S. Pat. Nos. 5,098,105 and 4,986,545 to Sullivan disclose golf ball covers that include blends of ionomers and thermoplastic rubber elastomers modified with a polar group, wherein the latter material is selected from the group consisting of a maleic anhydride modified ethylene propylene copolymer, a maleic anhydride modified styrenic block copolymer, and a maleic anhydride modified ethylene-vinyl acetate copolymer.

European Patent Application 0 557 069 describes a golf ball cover containing a heated mixture of an ionomer resin and a polymer containing a glycidyl group.

In each of the patents discussed above, one or more ionomers are blended with a non-ionic polymer, containing groups such as maleic anhydride and glycidyl methacrylate that provide strong interactions between the ionomeric and non-ionic polymer components in the mixture. Therefore, the ionomers and non-ionic polymers are at least partially miscible, and compatible blends can be formed without a compatibilizer. None of the patents discussed above discloses immiscible blends of ionomers and polymers that require a compatibilizer to produce useful golf ball core, cover, or mantle layer compositions.

Gersappe et al., *The Use of Graft Copolymers to Bind Immiscible Blends,* Science, 265 (1994), describe copolymers with side chains that associate across boundaries between phase-separated regions in polymer blends to bind the regions together, and to enhance the structural integrity and mechanical properties of the resulting material. Normally incompatible mixtures of deuterated poly(ethyl acrylate) ("d-PEA") and deuterated poly(methyl methacrylate) ("d-PMMA"), compatibilized with PEA-polystyrene and PMMA-polystyrene are disclosed. There is no disclosure of compatibilized blends of ionomers and other, softer polymers that would normally be incompatible.

U.S. Pat. No. 5,321,089 to Cadorniga et al. describes a golf ball cover, containing ethylene-methyl acrylate, blended with an ionomer resin and a compatibilizer. The compatibilizer consists of a copolymer or terpolymer containing 80 to 95 percent by weight of an olefin, preferably ethylene, 20 to 5 percent by weight of an α,β-ethylenically unsaturated carboxylic acid, preferably acrylic or methacrylic acid, and possibly containing a small amount of an n-alkyl acrylate, such as n-butyl acrylate. The disclosed balls had durability properties superior to balata covered balls, failing in a hit test after only 145 to 182 hits. This is significantly less durable than golf ball covers made from ionomer blends.

None of these compositions provide the combination of durability and distance that is provided by two-piece balls with ionomer covers and the high spin rate and control that is available with a three-piece, wound balls with balata covers. Therefore, there remains a need for a method of making golf ball cores and covers that provides for the blending of thermoplastic ionomers with other, non-ionic polymers that are normally incompatible with ionomers to provide a one-piece, two-piece, or three-piece, wound golf ball with the durability and distance of a SURLYN® covered two-piece ball and the feel, click, and control of a balata covered three-piece ball. The present invention provides such a method, and produces such a product.

SUMMARY OF THE INVENTION

The present invention relates to golf balls, and, in particular, to golf balls having at least one layer comprising about 4 percent to 95 percent of at least one ionomer resin; about 95 percent to 4 percent of at least one non-ionic polymer; and about 1 to 15 parts per hundred ("phr"), based on 100 parts per weight of combined ionic and non-ionic polymers, of at least one non-carboxylic acid compatibilizer. The layer may be the cover, a layer in the cover, i.e., part of a multi-layer cover, an intermediate or mantle layer, or a layer in the core.

Non-carboxylic acid compatibilizers useful in the invention include functionalized block and graft polymers, oligomers, and mixtures thereof, wherein at least one portion of the non-carboxylic acid compatibilizer is miscible with the at least one ionomer and at least one portion of the non-carboxylic acid compatibilizer is miscible with the at least one non-ionic polymer. Preferred non-carboxylic acid compatibilizers include olefinic block, random, and graft thermoplastic polymers and oligomers, which contain monomers and comonomers functionalized with groups selected from the group consisting of acids, esters, epoxies, isocyanates, hydroxys, anhydrides, amines, thiols; polyester-polyether block copolymers; polyamide-polyether block copolymers; polysiloxanes; silicones; styrene-butadiene and hydrogenated styrene-butadiene block co-polymers; and mixtures thereof. The styrene-butadiene and hydrogenated styrene-butadiene block co-polymers may be functionalized with acids, esters, epoxies, isocyanates, hydroxys, anhydrides, amines, oxazolines, and thiols.

Non-ionic polymers useful in the invention include polyamides, polyurethanes, polyesters, poly(alkylacrylates), homopolymers and copolymers of fluoropolymers, siloxanes, and functionalized or unfunctionalized styrene-butadiene-isoprene polymers. Useful ionomers include olefinic, polyester, polyamide, polyether, polycarbonate, polyurethane, polyacrylate, and polyalkyl homopolymer and copolymer ionomers. Preferred ionomers are copolymers of from about 70 to 95 percent of an olefin and from about 30 to 5 percent of an α,β-ethylenically unsaturated carboxylic acid, where at least a portion of the carboxylic acid groups are neutralized with a metal atom. The most preferred ionomers are copolymers of ethylene and acrylic or methacrylic acid, where at least a portion of the carboxylic acid groups are neutralized with zinc, sodium, magnesium, lithium, calcium, manganese, aluminum, or ammonium derivatives.

Preferably, the golf ball of the invention includes at least one layer, typically the cover or a layer in a multi-layer cover, comprising about 4 percent to 95 percent of at least one ionomer resin; about 95 percent to 4 percent of at least one non-ionic copolymer of an olefin and an acrylate or methacrylate ester comonomer of formula HRC=CR'COOC$_n$H$_{2n+1}$, where R and R' are the same or different, and are hydrogen or methyl, and n is 1 or greater, preferably at least 3; and about 1 to 15 phr of at least one non-carboxylic acid compatibilizer selected from the group consisting of copolymers of an olefin and an alkyl acrylate or alkyl methacrylate, functionalized with maleic anhydride, terpolymers of an olefin, an alkyl acrylate or alkyl methacrylate, and carbon dioxide, functionalized with maleic anhydride, copolymers of an olefin and vinyl acetate, functionalized with maleic anhydride, copolymers of an olefin and an alkyl acrylate or alkyl methacrylate, functionalized with glycidyl acrylate or methacrylate, and copolymers of olefins with oxazoline or imide groups.

The most preferred golf ball compositions of the invention comprise an ionomer, a copolymer of ethylene and n-butyl acrylate, and a non-carboxylic acid compatibilizer of a copolymer of ethylene and vinyl acetate, functionalized with about 0.01 percent to about 5 percent of maleic anhydride, a copolymer of ethylene and n-butyl acrylate, functionalized with about 0.01 percent to about 5 percent maleic anhydride, a terpolymer of ethylene, n-butyl acrylate and carbon monoxide, functionalized with about 0.01 percent to about 5 percent maleic anhydride, or a copolymer of ethylene and n-butyl acrylate, functionalized with about 0.1 percent to about 6 percent of glycidyl methacrylate or acrylate.

The invention also relates to a method of making a golf ball, which comprises forming a golf ball core, forming a blend of at least one ionomer resin, at least one non-ionic polymer, and at least one non-carboxylic acid compatibilizer, and molding the blend around the golf ball core to form at least one layer in the golf ball, wherein the blend is any of the golf ball blends described above.

DETAILED DESCRIPTION OF THE INVENTION

As used herein, the terms "non-carboxylic acid compatibilizer" and "non-carboxylic acid polymer" refer to polymers or oligomers that are substantially free of any monomers containing an α,β-ethylenically unsaturated carboxylic acid. However, non-carboxylic acid polymers, oligomers, and compatibilizers may contain monomers comprising other acidic moieties.

In addition, as used herein, a "compatibilized polymer blend" or a "compatible polymer blend" is a blend of two or more polymers that is heterogeneous on a microscopic scale, but homogeneous on a macroscopic scale, and has useful golf ball properties. An "incompatible polymer blend" is a mixture of at least two polymers that is heterogeneous on a macroscopic scale, in which useful golf ball properties, such as durability, are lacking.

The term "layer" includes any generally spherical portion of a golf ball or golf ball core, cover, or mantle or intermediate layer, including one-piece cores and one-piece balls. A mantle is defined herein as a portion of the golf ball that occupies the volume between the cover and the core. Of course, as one of ordinary skill in the art would recognize, any of the core, cover, and mantle of the golf balls of the invention can be formed of one layer or a plurality of layers, as that term is defined herein.

The present invention is directed to methods and compositions for use in the manufacture of golf balls, and, in particular, golf ball cores, mantles, and covers and any layer of a golf ball cover, core or mantle. The compositions of the present invention comprise compatibilized blends of ionomers and other, non-ionic polymers that are normally incompatible with ionomers, such as non-polar polymers and polar polymers that are sufficiently different chemically from ionomers to be incompatible with ionomers without the use of at least one non-carboxylic acid compatibilizer. Typically, the incompatibility is the result of large differences in the polarity of the ionomer and the other, non-ionic polymer. Although the non-ionic polymer may be polar, it may be sufficiently different chemically from an ionomer that the blend lacks the strong interactions that are required for the polymers to be miscible, so that two distinct phases form in the blend. The blends of the invention are compatibilized with non-carboxylic acid block, graft, or random polymers or oligomers, or mixtures thereof that are at least partially miscible with both components of what would otherwise be an incompatible mixture, i.e., an ionomer and a non-polar polymer or a polar, but chemically different polymer. The compatibilized blends can be used as golf ball covers for three-piece, wound golf balls and for two piece balls with liquid and solid cores, as well as in cores for two-piece balls, in unitary or one-piece balls, and in multi-core or multi-cover golf balls.

The present invention is further directed to a method of making a composition for a golf ball core or cover or any layer in a golf ball that is part of the cover, core, or a mantle layer between the cover and the core, comprising compatibilizing an otherwise incompatible mixture of one or more ionomers and non-polar polymers or an otherwise incompatible mixture of one or more ionomers and a polar, but chemically different polymer, or mixtures thereof by forming a mixture of the incompatible polymers and a non-carboxylic acid compatibilizer of an appropriate block, graft, or random polymer or oligomer or mixture thereof that is miscible in both components of the otherwise incompatible mixture described above.

Preferably, the blends are formed by combining the incompatible polymers in, for example, a twin-screw extruder, and then adding the non-carboxylic acid compatibilizer to produce a compatible blend of the otherwise incompatible polymers. Once the compatibilized blends are formed in the extruder or in other polymer processing equipment known in the art, conventional equipment used in the production of golf balls may be used to form the golf balls of the invention.

Compatibilization of blends of two or more different and normally incompatible polymers dramatically improves the mechanical and thermal properties of the blends. Golf balls and, in particular, golf ball covers produced from incompatible polymer blends without non-carboxylic acid compatibilizers, lack durability, and crack or split into pieces when hit with a golf club. In contrast, the compatibilized blends of the invention, particularly when used in golf ball covers, provide golf balls having the durability and distance of ionomer covered two-piece balls and the feel, click and control of balata covered three-piece balls.

The ionomers useful in the compositions of the invention are typically thermoplastic ionomers, and include olefinic, polyester, polyamide, polyether, polycarbonate, polyurethane, polyacrylate, and polyalkyl homopolymer and copolymer ionomers. Preferably, the ionomer is a copolymer of an olefin and an α,β-ethylenically unsaturated carboxylic acid, where at least a portion of the carboxylic acid groups are neutralized with a metal derivative. The ionomer may also be a very low modulus ionomer ("VLMI"), i.e., a terpolymer of an olefin, an α, β-ethylenically unsaturated carboxylic acid, and an acrylate or methacrylate ester, typically n- or iso-butyl-acrylate, where at least a portion of the acid groups are neutralized with a metal derivative.

Most preferably, the olefin is ethylene, and the α,β-ethylenically unsaturated carboxylic acid is acrylic or methacrylic acid, where the metal derivative is a zinc, sodium, magnesium, lithium, calcium, manganese, aluminum, or ammonium derivative.

Non-polar polymers useful in the present invention include polyethylene, polyisoprene, polybutadiene, ethylene-propylene, EPDM, vulcanized EPDM/PP, and styrene-butadiene-isoprene. The preferred non-ionic polymers are non-ionic copolymers of an olefin, preferably ethylene, and an acrylate or methacrylate ester of formula $HRC=CR'COOC_nH_{2n+1}$, where R and R' are the same or different and are hydrogen or methyl, and n is 1 or greater, but is preferably at least 3. The most preferred polymer is a copolymer of ethylene and n-butyl acrylate.

The non-carboxylic acid compatibilizers of the present invention are chosen for their compatibility with both the ionomer and the non-polar polymer or polar, but chemically different polymer that is used in the blend. Simply put, one portion of the non-carboxylic acid compatibilizer is miscible with the ionomer, while a second portion is miscible with the other polymer in the blend. This increases the interfacial tension between the polymers, and produces an attraction between the polymers at the interface that does not exist without a non-carboxylic acid compatibilizer. Thus, the non-carboxylic acid compatibilizer acts as a "molecular zipper" that effectively binds the polymers of the compatibilized blend together, and produces a miscible blend of the ionomer, the otherwise incompatible polymer, and the non-carboxylic acid compatibilizer.

Useful non-carboxylic acid compatibilizers include block, random, and graft thermoplastics and oligomers, such as block, random, and graft thermoplastics based on homopolymers and copolymers of olefinic monomers with comonomers containing functionalized groups that enable the non-carboxylic acid compatibilizer to be miscible with both the ionomer and the non-polar polymer or polar, but chemically different polymer. Functionalized polymers useful in the invention include copolymers of olefinic monomers with comonomers containing functionalized groups of acids, esters, epoxies, isocyanates, hydroxys, anhydrides, amines, and thiols, e.g., copolymers of ethylene with alkylacrylates or glycidyl acrylate. Useful non-carboxylic acid compatibilizers also include block copolymers such as copoly(ether ester), such as Du Pont's Hytrel, and copolyether-amide (Pebax). Other useful block copolymers include styrene-butadiene and hydrogenated styrene-butadiene block co-polymers. These block copolymers may also be functionalized with functional groups such as acids, esters, epoxies, isocyanates, hydroxys, anhydrides, amines, and thiols. Polysiloxanes and silicones are also useful.

The most preferred non-carboxylic acid compatibilizers for this embodiment are copolymers of an olefin, preferably ethylene, and an alkyl acrylate or alkyl methacrylate, preferably n-butyl acrylate, functionalized with maleic anhydride, preferably about 0.01 percent to about 5 percent maleic anhydride; terpolymers of an olefin, preferably ethylene, an alkyl acrylate or alkyl methacrylate, preferably n-butyl acrylate, and carbon monoxide, functionalized with maleic anhydride, preferably about 0.01 percent to about 5 percent maleic anhydride; copolymers of an olefin, preferably ethylene, and vinyl acetate, functionalized with maleic anhydride, preferably about 0.01 percent to about 5 percent of maleic anhydride; copolymers of an olefin, preferably ethylene, and an alkyl acrylate or alkyl methacrylate, preferably n-butyl acrylate, functionalized with glycidyl methacrylate or acrylate, preferably about 0.1 percent to about 6 percent of glycidyl methacrylate or acrylate; and copolymers of olefins with oxazoline or imide comonomers.

In a first embodiment, the compositions of the present invention comprise a blend of about 4 to about 95 weight percent of an olefinic ionomer, preferably about 40 to about 90 weight percent, about 95 to about 4 weight percent of a non-polar polymer, preferably 60 to about 10 weight percent, and about 1 to about 15 phr of a block, graft, or random polymer or oligomer, or mixture thereof, as a non-carboxylic acid compatibilizer.

In an alternate embodiment, about 4 to about 95 weight percent of an ionomer, preferably about 40 to about 90 weight percent, is blended with about 95 to about 4 weight percent of a polar, but chemically different polymer, preferably about 60 to about 10 weight percent, and about 1 to about 15 phr of a non-carboxylic acid compatibilizer of a block, graft, or random polymer or oligomer or mixture thereof.

Typical polar polymers include, but are not limited to, polyamides, polyurethane, polyesters, poly(alkylacrylate), fluoropolymers, siloxanes, and functionalized styrene-butadiene-isoprene polymers.

Typically, the compositions of the invention comprise a compatibilized blend of a relatively hard ionomer and a softer, non-polar or polar, but chemically different, non-ionic polymer. However, useful blends according to the present invention also include compatibilized blends of a soft ionomer, typically a VLMI, and a harder, non-ionic polymer. The flexural modulus and hardness of the ionomer, non-polar or polar, but chemically different non-ionic polymer, and the compatibilizer can be selected to vary the flexural modulus and hardness of the layer, and to provide a desired set of golf ball properties. Therefore, the flexural modulus of the ionomer preferably ranges from about 1,000 to about 150,000 psi, more preferably from about 1,000 to about 120,000, most preferably from about 2,000 to about 110,000, and the flexural modulus of the non-polar or polar, but chemically different non-ionic polymer preferably ranges from about 1,000 to about 500,000 psi, more preferably from about 1,000 to about 400,000, most preferably from about 2,000 to about 300,000. The flexural modulus of the non-carboxylic acid compatibilizer preferably ranges from about 1,000 to about 150,000 psi, more preferably from about 1,000 to about 120,000, most preferably from about 2,000 to about 110,000.

EXAMPLES

The following non-limiting examples are merely illustrative of the preferred embodiments of the present invention, and are not to be construed as limiting the 10 invention, the scope of which is defined by the appended claims.

Tests were performed to compare the durability of golf ball covers based on a blend of an ionomer and a non-ionic copolymer of ethylene-n-butyl acrylate incorporating a non-carboxylic acid compatibilizer of a functionalized polymer with golf ball covers based on a similar blend that lacked the non-carboxylic acid compatibilizer and with "standard" ball covers based on a blend of ionomer resins. The polymer blends are given in Table I, where the amount of each component is given in parts per hundred ("phr").

Example 1 is representative of a commercially available ball, and incorporates a cover blend of a commercially available ionomer, believed to comprise about 13 to about 17 percent acid, and to be neutralized with lithium, and a commercially available very low modulus ionomer ("VLMI"), believed to comprise about 9 to about 12 percent acid, and to be neutralized with sodium. Example 2 incorporates a cover blend of a commercially available ionomer, believed to comprise about 13 to about 17 percent acid, and to be neutralized with lithium, and a commercially available, non-ionic copolymer of ethylene and and about 17 to about 21 percent n-butyl acrylate. Example 3 incorporates a non-carboxylic acid compatibilizer according to the invention of ethylene-vinyl acetate functionalized with 1 percent maleic anhydride into the blend of Example 2.

Golf balls incorporating the non-carboxylic acid compatibilizers of the invention show dramatically improved durability in hit tests. Example 3 demonstrates that blends incorporating the present non-carboxylic acid compatibilizers can sustain 550 hits before the failure of a single ball, and 800 hits before 50 percent of the balls fail. In contrast, in Example 2, blends of the lithium ionomer with the copolymer of ethylene with 19 percent n-butyl acrylate, but lacking a non-carboxylic acid compatibilizer, only require about 100 hits before the first failure and 250 hits before 50 percent failure. The golf balls produced in accordance with the present invention are also more durable than those made from blends incorporating acid compatibilizers, as disclosed in U.S. Pat. No. 5,321,089 to Cadorniga et al. When compared to the ionomer blend balls, the balls of the invention provided a decrease in Shore D hardness for improved feel, comparable initial velocity, and equivalent or improved durability.

TABLE I

| Ingredients | 1 | 2 | 3 |
| --- | --- | --- | --- |
| Surlyn 7940[1] | 55 | 55 | 55 |
| Surlyn 8320[2] | 45 | — | — |
| Quantum 719-009[3] | — | 45 | 45 |
| Fusabond MG-197D[4] | — | — | 10 |
| White Concentrate | 5 | 5 | 5 |
| Shore D Hardness | 64.3 | 62.4 | 60.9 |
| Initial Velocity-fps | 252.8 | 251.0 | 251.0 |
| Durability Test First Failure at | 600 hits | 100 hits | 550 hits |
| Durability Test 50% Failure at | 650 hits | 250 hits | 800 hits |

[1] lithium ionomer containing about 12 to about 17% acid
[2] sodium ionomer containing about 9 to about 12% acid
[3] Ethylene 19% n-butyl acrylate from Quantum Chemical.
[4] Ethylene-vinyl acetate functionalized with 1% maleic anhydride from Du Pont Canada.

While it is apparent that the invention disclosed herein is well calculated to fulfill the objects stated above, it will be appreciated that numerous modifications and embodiments may be devised by those skilled in the art. Therefore, it is intended that the appended claims cover all such modifications and embodiments as falling within the true spirit and scope of the present invention.

I claim:

1. A golf ball comprising a cover and a core, wherein the golf ball has at least one layer formed of a compatibilized blend comprising about 4 percent to 95 percent of at least one ionomer resin; about 95 percent to 4 percent of at least one non-ionic polymer that is not compatible with the ionomer in the absence of a compatibilizer, wherein the at least one non-ionic polymer is selected from the group consisting of polyolefins, polyisoprene, polybutadiene, ethylene-propylene, EPDM, vulcanized EPDM/PP, polyamides, polyurethanes, polyesters, homopolymers of alkyl acrylates, polymers consisting of olefins and one or more alkylacrylates, fluoropolymers, siloxanes, and non-ionic copolymers of an olefin and an acrylate or methacrylate ester of formula $HRC=CR'COOC_nH_{2n+1}$, where R and R' are independently hydrogen or methyl, and n is an integer of at least 1; and about 1 to 15 phr, based on 100 parts ionomer resin and non-ionic polymer, of at least one compatibilizer, free of any monomers containing an $\alpha,\beta$-ethylenically unsaturated carboxylic acid, comprising a material selected from the group consisting of functionalized block and graft polymers, oligomers, and mixtures thereof, wherein at least one portion of the compatibilizer is compatible with the at least one ionomer and at least one portion of the compatibilizer is compatible with the at least one non-ionic polymer.

2. The golf ball of claim 1, wherein the layer forms at least a part of the cover.

3. The golf ball of claim 1, wherein the layer forms a least a part of a mantle layer between the cover and the core.

4. The golf ball of claim 1, wherein the compatibilizer is selected from the group consisting of olefinic block, random, and graft thermoplastic polymers and oligomers, which contain monomers and comonomers functionalized with groups selected from the group consisting of acids other than $\alpha,\beta$-ethylenically unsaturated carboxylic acids, esters, epoxies, isocyanates, hydroxys, anhydrides, amines, thiols; polyester-polyether block copolymers; polyamide-polyether block copolymers; polysiloxanes; silicones; and mixtures thereof.

5. The golf ball of claim 1, wherein the at least one non-ionic polymer is selected from the group consisting of polyamides, polyurethanes, polyesters, homopolymers of alkyl acrylates, copolymers of olefins and alkylacrylates, fluoropolymers, and siloxanes.

6. A golf ball comprising a cover and a core, wherein the golf ball has at least one layer formed of a compatibilized blend comprising about 4 percent to 95 percent of at least one ionomer resin; about 95 percent to 4 percent of at least one non-ionic copolymer that is not compatible with the ionomer in the absence of a compatibilizer, wherein the non-ionic polymer comprises an olefin and an acrylate or methacrylate ester of formula $HRC=CR'COOC_nH_{2n+1}$, where R and R' are the same or different and are hydrogen or methyl, and n is 1 or greater; and about 1 to 15 phr, based on 100 parts ionomer resin and non-ionic polymer, of at least one compatibilizer, free of any monomers containing an $\alpha,\beta$-ethylenically unsaturated carboxylic acid, selected from the group consisting of copolymers of an olefin and an alkyl acrylate or alkyl methacrylate, functionalized with maleic anhydride, terpolymers of an olefin, an alkyl acrylate or alkyl methacrylate, and carbon monoxide, functionalized with maleic anhydride, polymers consisting of one or more olefins and one or more alkyl acrylates or alkyl methacrylates, functionalized with glycidyl methacrylate or acrylate, and copolymers of olefins with oxazolines or imides.

7. The golf ball of claim 6, wherein the layer forms at least a part of the cover.

8. The golf ball of claim 6, wherein the layer forms a least a part of a mantle layer between the cover and the core.

9. The golf ball of claim 6, wherein the non-ionic polymer is a copolymer of ethylene and n-butyl acrylate.

10. The golf ball of claim 6, wherein the compatibilizer is a copolymer of ethylene and n-butyl acrylate, functionalized with about 0.01 percent to about 5 percent maleic anhydride.

11. The golf ball of claim 6, wherein the compatibilizer is a terpolymer of ethylene, n-butyl acrylate, and carbon monoxide, functionalized with about 0.01 percent to about 5 percent maleic anhydride.

12. The golf ball of claim 6, wherein the compatibilizer is a copolymer of ethylene and n-butyl acrylate, functionalized with about 0.1 percent to about 6 percent of glycidyl methacrylate or acrylate.

13. The golf ball of claim 6, wherein the ionomer is selected from the group consisting of olefinic, polyester, polyamide, polyether, polycarbonate, polyurethane, polyacrylate, polyalkylacrylate homopolymers, and olefinic/alkylacrylate copolymer ionomers.

14. The golf ball of claim 13, wherein the ionomer is a copolymer of an olefin and an $\alpha,\beta$-ethylenically unsaturated carboxylic acid, where at least a portion of the carboxylic acid groups are neutralized with a metal atom.

15. The golf ball of claim 14, wherein the olefin is ethylene, the $\alpha,\beta$-ethylenically unsaturated carboxylic acid is acrylic or methacrylic acid, and the metal atom is zinc, sodium, magnesium, lithium, calcium or manganese.

16. A method of making a golf ball, comprising: forming a, golf ball core; forming a blend of about 4 percent to 95 percent of at least one ionomer resin; about 95 percent to 4 percent of at least one non-ionic polymer that is not compatible with the ionomer in the absence of a compatibilizer, wherein the at least one non-ionic polymer is selected from the group consisting of polyolefins, polyisoprene, polybutadiene, ethylene-propylene, EPDM, vulcanized EPDM/PP, polyamides, polyurethanes, polyesters, homopolymers of alkyl acrylates, polymers of olefins and one or more alkylacrylates, fluoropolymers, siloxanes, and non-ionic copolymers of an olefin and an acrylate or methacrylate ester of formula HRC=CR'COOC$_n$H$_{2+1}$, where R and R' are independently hydrogen or methyl, and n is an integer of at least 1; and about 1 to 15 phr, based on 100 parts ionomer resin and non-ionic polymer, of at least one compatibilizer, free of any monomers containing an α,β-ethylenically unsaturated carboxylic acid, selected from the group consisting of functionalized block and graft polymers and oligomers, wherein at least one portion of the compatibilizer is compatible with the at least one ionomer and at least one portion of the compatibilizer is compatible with the at least one non-ionic polymer; and molding the blend around the golf ball core to form at least one layer in the golf ball.

17. The method of claim 16, further comprising forming the layer as at least a part of the cover.

18. The method of claim 16, further comprising forming as a least a part of a mantle layer between the cover and the core.

19. The method of claim 16, further comprising selecting the compatibilizer from the group consisting of olefinic block, random, and graft thermoplastic polymers and oligomers, which contain monomers and comonomers functionalized with groups selected from the group consisting of acids other than α,β-ethylenically unsaturated carboxylic acids, esters, epoxies, isocyanates, hydroxys, anhydrides, amines, thiols; polyester-polyether block copolymers; polyamide-polyether block copolymers; polysiloxanes; silicones; and mixtures thereof.

20. The method of claim 16, further comprising selecting the non-ionic copolymer from the group consisting of polyamides, polyurethane, polyesters, poly(alkylacrylate), fluoropolymers, and siloxanes.

21. A method of making a golf ball, comprising: forming a blend comprising from about 4 percent to 95 percent of at least one ionomer resin, about 95 percent to 4 percent of at least one non-ionic copolymer that is not compatible with the ionomer in the absence of a compatibilizer, wherein the non-ionic polymer comprises an olefin and an acrylate or methacrylate ester of formula HRC=CR'COOC$_n$H$_{2+1}$, where R and R' are the same or different and are hydrogen or methyl, and n is 1 or greater, and about 1 to 15 phr, based on 100 parts ionomer resin and non-ionic polymer, of at least one compatibilizer, free of any monomers containing an α,β-ethylenically unsaturated carboxylic acid, selected from the group consisting of copolymers of an olefin and an alkyl acrylate or alkyl methacrylate, functionalized with maleic anhydride, copolymers of an olefin and an alkyl acrylate or alkyl methacrylate, functionalized with glycidyl methacrylate or acrylate, and copolymers of olefins with oxazolines or imides, and molding the blend around a golf ball core to form at least one layer in the golf ball.

22. The method of claim 21, further comprising forming the layer as at least a part of the cover.

23. The method of claim 21, further comprising forming as a least a part of a mantle layer between the cover and the core.

24. The method of claim 21, further comprising selecting a copolymer of ethylene and n-butyl acrylate as the non-ionic copolymer.

25. The method of 21, further comprising selecting the compatibilizer from the group consisting of a copolymer of ethylene and n-butyl acrylate, functionalized with about 0.01 percent to about 5 percent maleic anhydride; a terpolymer of ethylene, n-butyl acrylate, and carbon monoxide functionalized with about 0.01 percent to about 5 percent maleic anhydride; and a copolymer of ethylene and n-butyl acrylate, functionalized with about 0.1 percent to about 6 percent of glycidyl methacrylate or acrylate.

26. The method of claim 21, further comprising selecting the ionomer from the group consisting of olefinic, polyester, polyamide, polyether, polycarbonate, polyurethane, polyacrylate, polyalkylacrylate homopolymers and olefinic/alkylacrylate copolymer ionomers.

27. The method of claim 26, further comprising selecting an ionomer of a copolymer of an olefin and an α,β-ethylenically unsaturated carboxylic acid, where at least a portion of the carboxylic acid groups are neutralized with a metal atom.

28. The method of claim 27, wherein the ionomer is ethylene, the α,β-ethylenically unsaturated carboxylic acid is acrylic or methacrylic acid, and the metal atom is zinc, sodium, calcium, manganese, magnesium or lithium.

* * * * *

UNITED STATES PATENT AND TRADEMARK OFFICE
CERTIFICATE OF CORRECTION

PATENT NO. : 5,919,862

DATED : July 6, 1999

INVENTOR(S) : Murali Rajagopalan

It is certified that error appears in the above-identified patent and that said Letters Patent is hereby corrected as shown below:

At column 10, line 11, in claim 6, change "$HRC=CR'COOC_nH_{2+1}$" to --$HRC=CR'COOC_nH_{2n+1}$--.

At column 10, line 28, in claim 8, change "a least" to --at least--.

At column 11, line 1, in claim 16, change "$HRC=CR'COOC_nH_{2+1}$" to --$HRC=CR'COOC_nH_{2n+1}$--.

At column 11, line 17, in claim 18, change "a least" to --at least--.

At column 11, line 39, in claim 21, change "$HRC=CR'COOC_nH_{2+1}$" to --$HRC=CR'COOC_nH_{2n+1}$--.

At column 12, line 13, in claim 23, change "a least" to --at least--.

Signed and Sealed this

Seventh Day of December, 1999

Q. TODD DICKINSON

*Attest:*

*Attesting Officer*  *Acting Commissioner of Patents and Trademarks*